United States Patent

Norton et al.

[15] 3,670,820
[45] June 20, 1972

[54] OIL RECOVERY METHOD USING DISPERSION OF CLAYS IN AQUEOUS POLYACRYLAMIDE SOLUTIONS

[72] Inventors: Charles J. Norton; David O. Falk, Denver, Colo.

[73] Assignee: Marathon Oil Company, Findlay, Ohio

[22] Filed: Aug. 28, 1970

[21] Appl. No.: 67,726

[52] U.S. Cl. .................................166/305 R, 252/8.55 D
[51] Int. Cl. .................................................E21b 43/22
[58] Field of Search .................................166/273–275, 283, 166/294, 295, 305 R; 252/8.5 A, 8.55 D

[56] References Cited

UNITED STATES PATENTS

| 3,051,234 | 8/1962 | Kyte | 166/275 |
| 3,370,649 | 2/1968 | Wolgemuth | 166/274 |
| 3,407,877 | 10/1968 | Harvey et al. | 166/274 |
| 3,500,922 | 3/1970 | O'Brien et al. | 166/273 |

Primary Examiner—Stephen J. Novosad
Attorney—Joseph C. Herring and Richard C. Willson, Jr.

[57] ABSTRACT

Improved viscosity and resistance factors of aqueous solutions containing partially hydrolyzed polyacrylamide are obtained by dispersing clay, e.g., sodium montmorillonite and phosphates in the solutions. The solutions are particularly useful as displacement fluids in the recovery of petroleum from earth formations.

10 Claims, 2 Drawing Figures

SCREEN "VISCOMETER"

"SCREEN FACTOR" = $\dfrac{\text{POLYMER SOLUTION TIME}}{\text{SOLVENT TIME}}$

OIL RECOVERY METHOD USING DISPERSION OF CLAYS IN AQUEOUS POLYACRYLAMIDE SOLUTIONS

CROSS REFERENCES TO RELATED APPLICATIONS

The following cases relate to the same general field as that of the present invention: U.S. Pat. No. 3,507,331; U.S. Pat. No. 3,467,187; Ser. No. 74,336 filed Sept. 22, 1970; Ser. No. 76,140 filed Sept. 28, 1970; Ser. No. 79,591 filed Oct. 9, 1970; Ser. No. 85,064 filed Oct. 29, 1970; Ser. No. 126,731 filed Mar. 22, 1971; Ser. No. 133,060 filed Apr. 12, 1971; Ser. No. 140,931 filed May 6, 1971.

BACKGROUND OF THE INVENTION

1. Field of the Invention

The present invention relates primarily to wells classified in Class 166 of the U.S. Patent Office, and more particularly to a production of earth fluid by driving fluid classified in Class 166 subclass 268 to 275.

2. Description of the Prior Art

A variety of prior art patents have taught the use of polyacrylamides especially for the preparation of displacement fluids for use in secondary and tertiary recovery of petroleum from subterranean formations. U.S. Pat. No. 3,191,676 teaches concurrent use of water-soluble phosphates and carbonates. The phosphates are used as detergents and the carbonates serve to prevent premature phosphate absorption on limestone. It cautions that the carbonate-phosphate system should be followed by a brine solution to prevent clay dispersion and subsequent partial plugging of the formation where the sandstones contain clay. It does not mention use of polymer thickener in conjunction with the phosphate; U.S. Pat. No. 3,208,518 teaches that polymer solutions are less viscous and more injective at pH below 5, but that minerals in the solution will generally return the injected solution back to the optimum pH range of 5-9 where these polymers have maximum viscosity. Phosphate is suggested as a buffer, but there is no mention of its interaction with clay; U.S. Pat. No. 2,827,964 teaches partially hydrolyzed polyacrylamides but mentions no clay or phosphate; U.S. Pat. No. 2,842,492 teaches the importance of solubility of the polymer in the presence of calcium ion but also mentions no clay or phosphate; U.S. Pat. No. 3,002,960 emphasizes the need for the polyacrylamide to be resistant to connate brines and to adsorption on formation rock but makes no mention of phosphate or clay; U.S. Pat. No. 3,039,529 teaches selectively partially hydrolyzed polyacrylamides but presents no specific information relative to phosphate or clay problems; U.S. Pat. No. 3,051,234 teaches aqueous suspensions of clays without organic thickening additives but does not mention phosphate; U.S. Pat. No. 3,074,481 is primarily concerned with well patterns and mentions no clay or phosphate; U.S. Pat. No. 3,139,929 is also primarily concerned with flooding geometry and does not mention clay or phosphate; U.S. Pat. No. 3,210,310 teaches in situ polymerization to give partial plugging around a well bore but mentions no phosphate-clay polymer interaction; U.S. Pat. No. 3,258,071 injects polyphosphate additives rather than simple orthophosphate to prevent precipitation of orthophosphate by alkaline earth ions in the formation; U.S. Pat. No. 3,476,186 teaches flooding with acrylic acid-acrylamide-diacetone acrylamide copolymer but mentions no clay or phosphates; U.S. Pat. No. 3,478,823 employs carbonate and phosphate as sacrificial materials to diminish adsorption of organic thickener on the formation especially on clay such as montmorillonite.

None of the above patents teaches the advantages obtained by the present invention by the intercombination of partially hydrolyzed polyacrylamides with selected clays and especially the intercombination of such mixtures with phosphates.

SUMMARY

General Statement of the Invention

Partially hydrolyzed polyacrylamides have been used as "thickening agents" to increase the viscosity of liquids, primarily displacing liquids for use in secondary petroleum recovery. Such uses are taught, e.g. in the aforementioned U.S. Pat. No. 3,039,529. Such polyacrylamides decrease the mobility of the displacing liquids to improve their efficiency in displacing oil-in-place from formations and moving the oil toward production wells. Decreasing the mobility of the displacing fluids minimizes "fingering" or channeling of the displacement fluids through the body of oil-in-place in the formation.

A laboratory method for obtaining a measure of the relative mobility of fluids is described in the American Institute of Mining Engineers paper "Factors Influencing Mobility Control by Polymer Solution" by R. R. Jennings, J. H. Rogers and T. J. West, SPE Paper No. 2867 prepared for the Ninth Biennial Production Techniques Symposium, held in Wichita Falls, Texas, May 14–15, 1970.

FIG. 1 shows the general type of apparatus utilized in such testing. In the testing, the liquids flow through screens and the ratio of the time required for the test solution to flow through the "screen viscometer" divided by the time required for a standard solvent (water) to flow through the viscometer is termed the "screen factor." According to the present invention, the "screen factor," containing some partially hydrolyzed polyacrylamide can be inexpensively and effectively increased by the addition of dispersed clays having an average particle size in the range of from about 40.0 to about 0.01, more preferably from 4.0 to about 0.1, and most preferably from 2.0 to about 0.5 microns. The present invention is useful with any of the general class of partially hydrolyzed polyacrylamides. The preferred polyacrylamides have molecular weights of from 0.1 to 100 million, more preferably from 1 to 10 million, and most preferably from 3 to 6 million and are hydrolyzed from 1 to 60 percent, more preferably from 10 to 30 percent of maximum hydrolysis.

As mentioned above, the processes and compositions of the present invention are useful for the decreasing of mobility of liquid solutions especially for use in the secondary and tertiary recovery of petroleum by displacement of oil-in-place from subterranean oil-bearing formations. In general, the techniques of secondary and tertiary recovery are applicable to the use of the invention and standard works such as *Secondary Recovery* by C. R. Smith, (Reinhold, 1966) should be consulted in this connection.

DESCRIPTION OF THE PREFERRED EMBODIMENTS

Starting Materials

Figure 1:
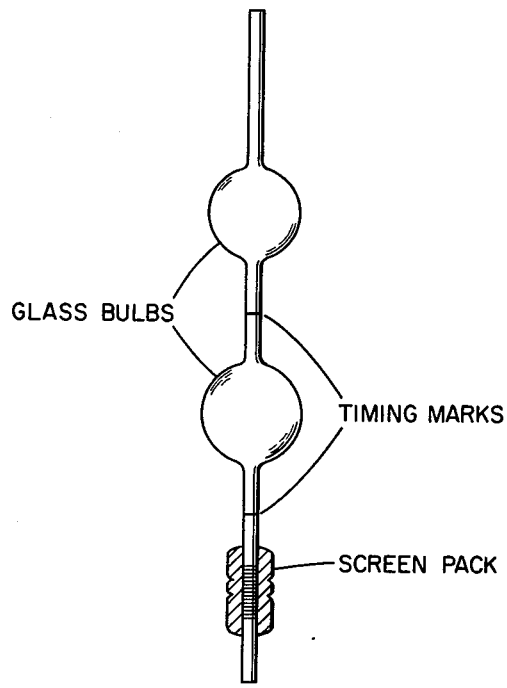
FIG. 1 is a schematic drawing of the screen viscometer utilized in the determination of screen factor.

As mentioned above, the polyacrylamides will preferably have molecular weights in the range of from about 0.1 to about 100 million, more preferably from 1 to 10 million, and most preferably from 3 to 6 million, and will be hydrolyzed, preferably from 1 to 60 percent of maximum hydrolysis, and more preferably from 10 to 30 percent of maximum hydrolysis. Preferably the polyacrylamides will be present in amounts of from 0.001 to about 1.0, more preferably from 0.01 to about 0.5, and most preferably from 0.02 to about 0.2 weight percent based on the weight of the total solution.

The clay material used for the present invention will preferably have particle sizes in the range of from about 40.0 to about 0.01, more preferably 4.0 to about 0.04, and most preferably from 2.0 to about 0.1 microns. By "clay" is meant herein natural earthy material which is plastic when wet, comprising hydrated silicates of aluminum. Typical examples include micaceous clays, e.g., illite, montmorillonites, e.g., sodium montmorillonites, diatomaceous earth, alumina, e.g., having chemical analyses of $Al_2O_3$, 90.2%; $Na_2O$, 0.4%; 3% $Fe_2O_3$; less than 0.36% $SiO_2$; less than 0.18% combined $H_2O$;9.1% by weight colloidal silicate, e.g., "Ludoz" sold by DuPont Company, kaolin, e.g., "Edger E.P.K." or "Eccles" from Putnam County, Florida, bentonite, bauxite, kieselguhr, attapulgite, hydrosilicates of aluminum having principal components selected from $SiO_2$ $Al_2O_3$, $Fe_2O_3$, CaO and MgO, magnesia, silica gel, thoria, zirconia, and clays containing beryllia. Most preferred are montmorillonites, particularly alkali metal and ammonium forms. Where desired, acid or caustic treatment for all other known clay for treatments, can be employed. Preferably from 10 to about 350,000, more preferably from 50 to 5,000, and most preferably from 150 to 300 parts per million by weight of clay will be present in the total liquid.

While not narrowly critical, the amount of phosphate will generally be in the range of from 5 to 20,000, more preferably 50 to 1,000, and most preferably 100 to 500 parts by weight of phosphate ion per million parts of solution.

By "phosphate" is meant herein any of the inorganic materials which contain the phosphate chemical groups orthophosphate, dihydrogen phosphate, hydrogen phosphate, pyrophosphate, metaphosphate, and tetraphosphate, e.g., sodium phosphate, $Na_3PO_4$, sodium dihydrogen phosphate, $NaH_2PO_4$, sodium hydrogen phosphate, $Na_2HPO_4$, sodium pyrophosphate, $Na_4P_2O_7$, sodium metaphosphate, $NaPO_3$, and sodium tetraphosphate, $Na_6P_4O_{13}$. Many of these salts may be used as pure or mixed salts with potassium and ammonium. They exist in a number of hydrated states. Most preferred are $Na_3PO_4$, $NaH_2PO_4$, and $Na_2HPO_4$ and their ammonium or alkali metal analogues.

The solvent for the liquid solutions of the present invention will comprise water, most preferably consist essentially of water. The water used with the present invention may be connate water, e.g., Palestinian line water, fresh water, or brackish water. It is preferable that the water contain less than about 300,000, more preferably less than about 10,000, and most preferably less than about 100 parts per million of dissolved solids. In cases where the water contains a muddy suspension, it is often possible to utilize the suspended matter as a portion of the clay to be added to decrease the mobility of the polymer solution according to the present invention.

While not necessary to the practice of the present invention, various other ingredients including among others, cellulose and surfactants, e.g., polyalylaryl sulfonates and other conventional displacement fluid additives may be added to the liquid polymer solutions. In addition to partially hydrolyzed polyacrylamide, other viscosity increasing agents, e.g., carboxymethyl, cellulose, and polyethylene oxides may be employed. Any of the aforementioned specific ingredients may be employed in admixture.

Preparation of Liquid Solutions

It will generally be preferable to merely mix the liquid solutions by adding first the partially hydrolyzed polyacrylamide, clay, and then the phosphate to the water while gently stirring to promote dispersion, suspension, and dissolving. The ingredients will preferably be mixed at a temperature somewhat above room temperature, more preferably from 0° to about 100° C., and most preferably from 20° to about 30° C. If desired, the mixing operation can be employed in one or more flow-type mixers or mixing tees so long as the proportions of the ingredients are properly measured and thoroughly mixed.

Examples

Examples 1–9

In the examples that follow, to minimize side-effects, solutions are prepared by dissolving polyacrylamide in deionized water containing 50 ppm $Ca^{++}$ and 200 ppm $Na^+$. The clay used is a sample of vacuum dried (at 83° C. for several hours) sodium montmorillonite designated as American Petroleum Institute No. 27, and having less than 0.5 micron average particle diameter. The solution compositions and properties are summarized in Table 1 which follows:

TABLE I

[Sodium tripolyphosphate (STPP) disperses clay into partially-hydrolyzed polyacrylamide (PA) solution, increasing resistance to flow]

| Example | Run Number | PA[b], p.p.m. | Composition clay, p.p.m. | STPP, p.p.m. | pH | Brookfield viscosity at 6 r.p.m. | Time, sec. | Flow resistance [c] ratio to water |
|---|---|---|---|---|---|---|---|---|
|  | Water | | | | | | 16.0 | 1.00 |
| 1 | Solution [a] No. 1 (B56572) | 500 | | | | 12.1 | 248.0 | 15.50 |
| 2 | Solution [a] No. 1 (B56572) | 500 | 150 | 150 | 8.24 | 14.9 | 296.6 | 18.53 |
| 3 | Solution [a] No. 1 (B56572) | 500 | 150 | 300 | 9.01 | 16.2 | 308.2 | 19.26 |
| 4 | Solution [a] No. 2 (B56574) | 500 | | | 8.88 | 12.2 | 251.4 | 15.71 |
| 5 | Solution [a] No. 2 (B56574) | 500 | 300 | 150 | 7.65 | 14.6 | 448.7 | 28.04 |
| 6 | Solution [a] No. 2 (B56574) | 500 | 300 | 300 | 8.30 | 15.3 | 519.0 | 32.43 |
| 7 | Solution [a] No. 2 (B56574) | 500 | | 100 | 7.60 | 14.0 | 289.2 | 18.07 |
| 8 | Solution [a] No. 2 (B56574) | 500 | | 200 | 7.85 | 15.0 | 294.6 | 18.41 |
| 9 | Solution [a] No. 2 (B56574) | 500 | | 300 | | 16.0 | 313.0 | 19.56 |

[a] Stock solution contains 50 p.p.m. $Ca^{++}$ and 200 p.p.m. $Na^+$ in deionized water.
[b] Dow-700 partially hydrolyzed polyacrylamide.
[c] Screen factor.

From the above results it can be seen that sodium tripolyphosphate (STPP) causes a small increase in the flow times and resistance factors at low clay concentrations (0 to 150 ppm). However, at high clay concentrations (300 parts per million), the flow times and resistance factors are nearly double those of the stock solution values. STPP apparently disperses and interacts with the clay and polyacrylamide to form larger aggregates having greater than 8 micron average particle diameter which results in increased resistance to flow through the 100 mesh screens of the screen viscometer, and a corresponding increase in resistance to the flow through porous formations in which at least a portion of the pores have diameters smaller than about 8 microns. Since many oil-bearing formations have such 8 micron or smaller pores, the invention is especially useful in decreasing the mobility of displacement fluids and obtaining more favorable ratios of the mobility of the displacing fluid to the mobility of the oil-in-place.

Figure 2:
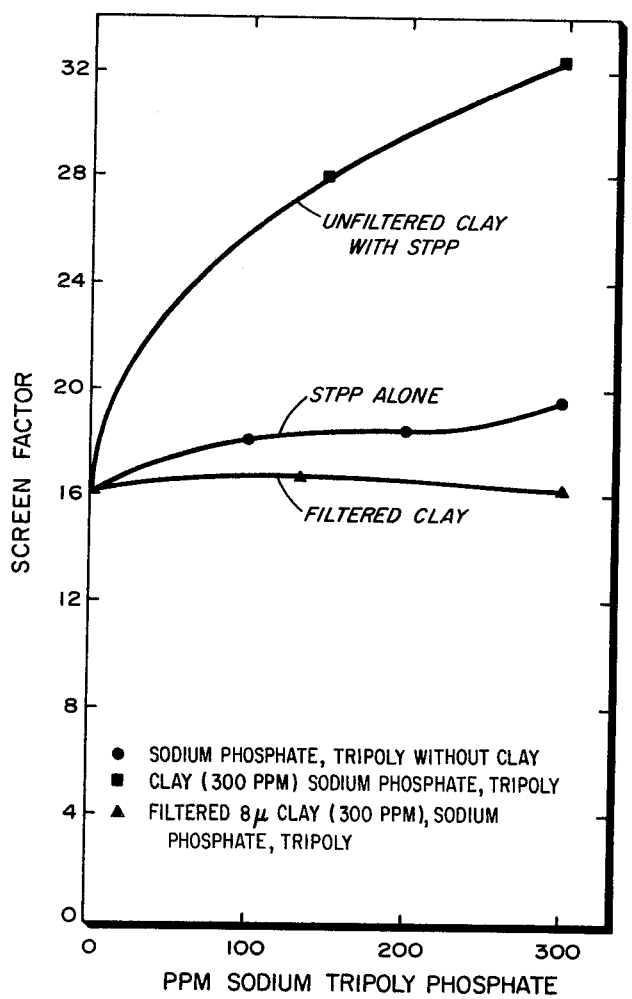
FIG. 2 is a plot of "screen factor" vs. polyphosphate concentration at various levels of clay content in aqueous polyacrylamide solutions with and without filtering after addition of the clay and phosphate, as determined in Examples 1–9.

While it is not intended that the present invention be restricted to any particular hypothesis, it appears that the combination of the phosphate with the clay forms globules having particle sizes greater than approximately 8 microns. These globules, in conjunction with the partially hydrolyzed polyacrylamide appear to provide a synergistic effect. Referring to FIG. 2 it will be noted that the top curve, clay plus phosphate, increases desirably with increasing amounts of phosphate. The middle curve, phosphate without clay, shows little increase with increasing amounts of phosphate. The lowest curve shows virtually no effect of clay/phosphate when the clay/phosphate/water/polyacrylamide mixture is filtered through after mixing an 8 micron Millipore (porous plastic disc) filter. This filter presumably removes the globules and virtually eliminates the desirable increases in screen factor which would otherwise be provided by the invention. Because of this, it is important that the phosphate/clay mixture not be filtered through a fine filter after mixing. While not particularly desirable, filtration of the phosphate/clay mixture through coarse (200 micron or larger) filters is permissible.

Example 10

When the solution prepared in Example 6 is injected into an injection well in an amount of approximately 0.1 pore volumes based on the total pore volume of the formation, oil-in-place is displaced away from the injection well and flows toward a production well from which it is produced. The "oil cut" is high (approximately 30 percent) indicating that little or no "fingering" or breakthrough of the displacement fluid into the production well exists.

Modifications

It should be understood that the invention is capable of a variety of modifications and variations which will be made apparent to those skilled in the art by a reading of the specification and which are to be included within the spirit of the claims appended hereto. For example, mixtures of various phosphates, clays, and polyacrylamides can be employed.

What is claimed is:

1. A process for the displacement of oil from oil-bearing formations comprising injecting into said formations aqueous compositions comprising partially hydrolyzed polyacrylamides, dispersed clays having an average particle size in the range of from about 40 to about 0.01 microns, and at least about 5 parts by weight of phosphate ion per million parts of solution.

2. The process of claim 1 wherein the partially hydrolyzed polyacrylamide has a molecular weight of from about 1 to about 10 million, and is present in the range of from about 0.01 to about 0.5 percent by weight based on the weight of the total solution, and wherein the clay has an average particle size within the range of from about 4.0 to about 0.04 microns and is present in amounts of from about 50 to about 5,000 parts per million by weight of clay based on the weight of the solution, and wherein the phosphate ion is selected from inorganic phosphate comprising orthophosphates, dihydrogen phosphates, hydrogen phosphates, pyrophosphates, metaphosphates, and tetraphosphates, and wherein the phosphate is present in the range of from about 50 to about 1,000 parts by weight per million parts of solution.

3. A process according to claim 2 wherein the solvent for the aqueous compositions consists essentially of water.

4. The process of claim 1 wherein the phosphate ion is selected from inorganic phosphates of the class consisting of ortho-phosphates, dihydrogen phosphates, hydrogen phosphates, pyrophosphates, metaphosphates, and tetraphosphates.

5. A process according to claim 4 wherein the solvent for the aqueous compositions consists essentially of water.

6. A process according to claim 1 wherein the phosphates are selected from the group consisting of $Na_3PO_4$, $NaH_2PO_4$, $Na_2HPO_4$, and their ammonium and alkali metal analogues.

7. The process of claim 1 wherein the clays are selected from the group consisting of micaeous clays, colloidal silicates, bentonite, bauxite, kieselguhr, attapulgite, hydrosilicates of aluminum and clays containing beryllia.

8. A process according to claim 1 wherein the clays are selected from the group consisting of montmorillonites of the alkali metal and ammonium forms.

9. A process according to claim 1 wherein the solvent for the aqueous compositions consists essentially of water.

10. A process according to claim 1 wherein the phosphate comprises sodium tripolyphosphate.

* * * * *